United States Patent [19]
Shannon et al.

[11] Patent Number: 5,620,809
[45] Date of Patent: Apr. 15, 1997

[54] STORAGE BATTERY AND METHOD OF MANUFACTURE

[75] Inventors: John K. Shannon; James M. Shannon, both of Racine, Wis.

[73] Assignee: Enersafe Corporation, Racine, Wis.

[21] Appl. No.: 437,287

[22] Filed: May 8, 1995

[51] Int. Cl.$^6$ ........................................ H01M 2/24
[52] U.S. Cl. .................. 429/160; 429/179; 429/180; 29/623.2; 29/623.4
[58] Field of Search ........................ 429/160, 178, 429/179, 180; 29/623.2, 623.4

[56] References Cited

U.S. PATENT DOCUMENTS

| | | | |
|---|---|---|---|
| 3,194,687 | 7/1965 | Shannon | 429/160 X |
| 3,261,719 | 7/1966 | Shannon | 136/134 |
| 3,476,611 | 11/1969 | Sabatino | 136/134 |
| 3,518,127 | 6/1970 | Aronson | 429/160 |
| 3,615,864 | 10/1971 | Consolloy | 429/160 |
| 3,753,783 | 8/1973 | Eberle | 429/160 X |
| 3,808,055 | 4/1974 | Eberle | 429/160 |
| 3,841,915 | 10/1974 | Eberle | 429/160 X |
| 4,171,564 | 10/1979 | Acton et al. | 29/623.2 |
| 4,509,253 | 4/1985 | Eberle | 29/623.2 X |
| 4,658,499 | 4/1987 | Rowlette | 429/160 X |
| 4,675,991 | 6/1987 | Byers | 29/623.1 |
| 4,800,142 | 1/1989 | Bish et al. | 429/160 X |
| 5,001,024 | 3/1991 | Eberle | 429/160 |
| 5,244,756 | 9/1993 | Mix et al. | 429/160 |

*Primary Examiner*—Stephen Kalafut
*Attorney, Agent, or Firm*—Jansson & Shupe, Ltd.

[57] ABSTRACT

An improved storage battery and method for manufacture. The battery includes a case with first and second walls, surrounding wall structure and partitions forming first, last and at least one middle cells, each containing a group of positive and negative plates and electrolyte. The first wall inner surface forms positive and negative lead-containing wells in alignment with the wells of adjacent cells, and an intercell connector across each partition and held in fluid-tight engagement with the case in position to electrically connect the lead in one well of a middle cell to the lead in a well of the adjacent cell. The method of manufacture includes molding plastic to form a case having first walls, second walls, surrounding wall structure and partitions to form first, last and at least one middle cell, the first wall having positive and negative wells which extend to the partitions and are in alignment with the negative and positive wells, respectively, of the adjacent cells; placing an intercell connector across each partition; pouring molten lead into each well so that the lead in each middle cell engages an intercell connector; inserting a cell group of plates into each cell, the plates having portions immersed in the molten lead in the wells before hardening; and closing the container by sealing an opposed second wall to the side walls.

18 Claims, 8 Drawing Sheets

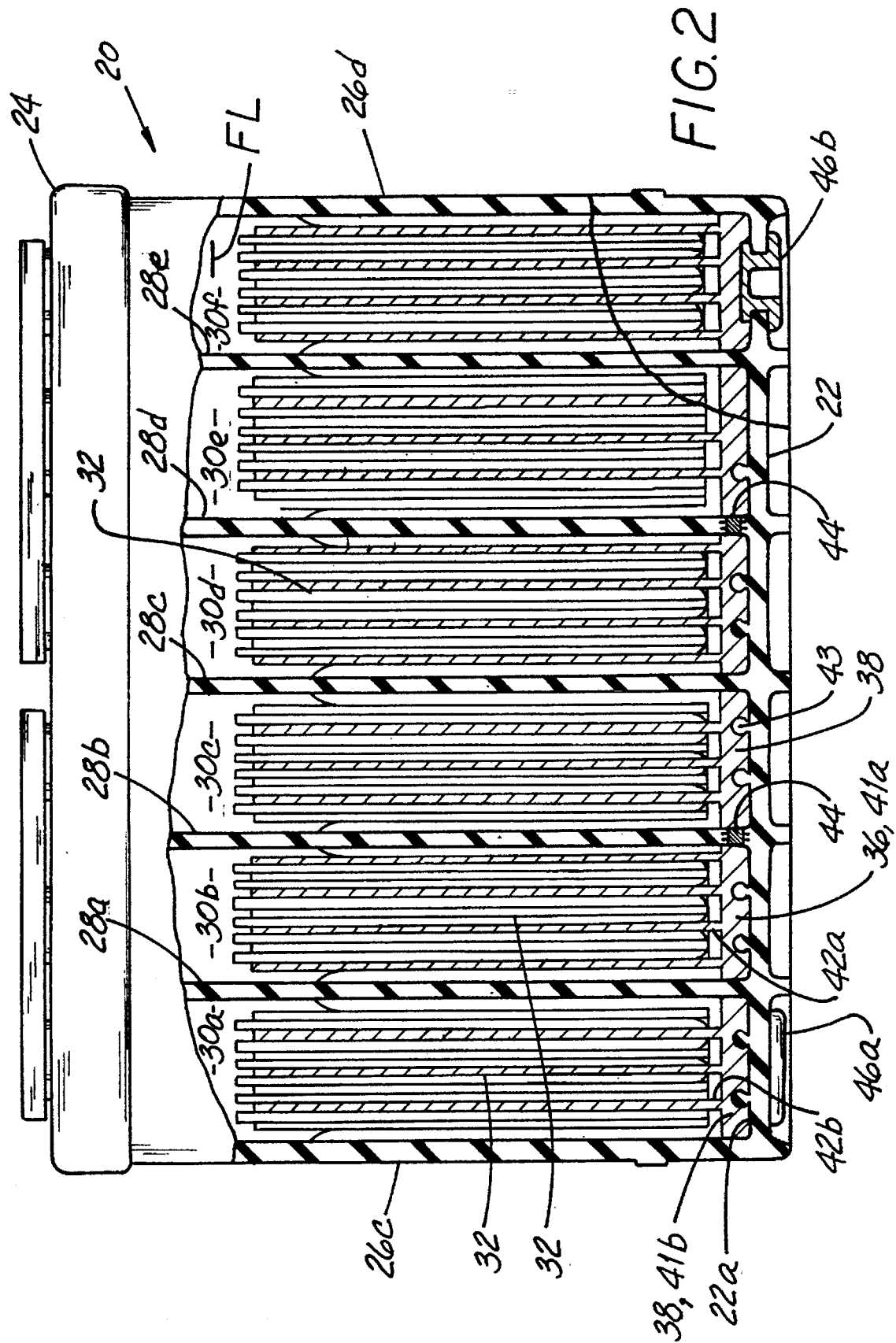

STORAGE BATTERY AND METHOD OF MANUFACTURE

FIELD OF THE INVENTION

This invention is related generally to batteries and, more particularly, to lead-acid storage batteries.

BACKGROUND OF THE INVENTION

Lead-acid storage batteries have long been an efficient and effective source of power for a variety of applications. From every indication it is clear that such batteries will continue in heavy use into the indefinite future. While much work has been done to develop nickel-cadmium batteries, nickel-iron batteries, lithium, sodium-sulphur systems and other electrochemical storage systems, and other alternative power sources, lead-acid batteries remain and are likely to remain the best choice for strong reasons, including their relatively low cost.

The economy and dependability of lead-acid storage batteries makes such batteries practical for a vast number of applications, including stand-by power systems for communication and emergency lighting, automotive and truck-starting applications, electric vehicles, wheel chairs, uninterruptable computer power supplies, and systems for solar and wind power storage, to name just a few.

Maximum flexibility in the design of the lead-acid battery is desirable because such batteries have so many varied applications and uses. Having the ability to position the battery terminals in different portions of the battery case greatly increases the number of design variations and alternative embodiments possible to the designer and seller.

A significant disadvantage to conventional lead-acid storage battery construction is the many separate electrical connections which must be made within the battery as separate welding operations. Conventional lead-acid storage batteries have intercell connections inside the battery just under the top wall. Such connections are typically made by separately welding an upstanding projection from a plate bridge of one cell to an upstanding projection from the plate bridge of the adjoining cell. The weld is through a hole in the battery container partition between cells. In a 12-volt post-style battery there are five such welds. These welds are typically made above the top of the plates in the headspace of the battery.

In addition to the intercell weldments in separate operations, plate groups within each battery cell are welded to their respective plate bridge along the tops of the plates. Another separate welding operation is incurred in welding the bridges of the first and last cells not connected to the inner cell. Thus, there are a substantial number of welds within the battery. The process of making these welds and connections is time consuming, unduly expensive and includes the possibility of miswelds and broken welds.

Conventional lead-acid batteries also use relatively large amounts of lead. Preferably, the use of lead should be minimized because of the effect of lead on humans. Therefore, when use of lead is necessary or beneficial, it is well accepted that use of less lead is desirable because that implies less human exposure to lead at all stages of production and use—both of the raw material itself and of the lead-containing product. It is likewise desirable to minimize human exposure by the nature of product design and the nature of manufacturing methods.

In the field of lead-acid batteries, progress has been made in recent years in reducing the handling of lead and exposure to lead in battery production. For one thing, progress has been made in recovering, recycling and reusing lead used in the manufacture of storage batteries; 96.8% is recovered according to 1991 data available from The Battery Council International. Among the advances more directly related to battery production methods are mechanization of welding operations and reduction of lead dust in manufacturing facilities.

Despite recent progress, there is a continuing need for improvements to reduce the amount of lead used in lead-acid storage batteries, to further reduce or eliminate human contact with lead in battery production and, more generally, to further reduce human exposure and health concerns related to lead use in storage batteries.

Another consideration or shortcoming with respect to lead-acid batteries has been their substantial weight or, stated differently, an energy density which is relatively low because of the heavy weight of the battery. This shortcoming is a particular concern in applications in which the power supply must be mobile, such as electric-powered vehicles, where total vehicle weight is a factor determining and limiting vehicle range.

Everyone concedes or would concede that it is wasteful and environmentally unsound to use more lead than necessary in batteries. It is also known that long electrical paths increase the internal resistance of the battery and, as a result, decrease its energy density. Certain limited progress has been made in recent years in shortening the electrical path from the battery cells to the external battery terminals. This has been done mainly with certain "through-the-partition" cell connectors and the use of external side terminals.

Yet there is a long-standing unsatisfied need in the field of lead-acid storage batteries for batteries which have a still shorter electrical path and which, in whatever way, are substantially lower in weight and higher in energy output than the conventional lead-acid storage batteries of recent years.

Certain of the above problems and shortcomings have been addressed in earlier work, including the disclosures of U.S. Pat. No. 3,261,719. The device of such patent has lead-receiving cavities in its base which extend from one cell to an adjacent cell and provide electrical union. The case of such device has side walls and partitions which are unitary with the top wall, and this structure is essentially glued to the base by the insertion of epoxy over the lead and most of the base in position to join with the walls and partitions.

The device of U.S. Pat. No. 3,261,719, while it does address certain problems has leakage potential because of its method of manufacture. Because of the construction of such device, heat sealing by ultrasonic welding, or other modern methods, is not easily done. Furthermore, its method of manufacture has too many steps, and is therefore potentially slow and costly. The invention was never used commercially.

Thus, the many problems noted above have remained unsolved. There is an important, long-standing need for improvement in lead-acid batteries.

OBJECTS OF THE INVENTION

It is an object of this invention to provide lead-acid storage batteries overcoming problems in the art, including those mentioned above.

Another object of this invention is to provide a method of manufacturing lead-acid storage batteries overcoming problems in the prior art.

It is an object of this invention is to provide a storage battery which is easier and less expensive to manufacture than batteries of the prior art.

An object of the invention is to provide a storage battery in which the electrical circuitry between cell groups and terminals is manufactured in a single step.

A further object of this invention is to provide a storage battery in which the terminals may be easily be positioned in different portions of the battery case.

Another object of this invention is to provide a lighter and more efficient lead-acid storage battery.

Yet another object of this invention is to reduce human contact with lead used in lead-acid storage batteries.

Another object of this invention is to reduce the amount of lead used in lead-acid storage batteries.

Another object of this invention is to shorten the electrical path in lead-acid storage batteries.

Another object is to provide lead-acid storage batteries which are lower in weight and higher in energy output than conventional lead-acid storage batteries.

Yet another object of this invention is to provide an improved lead-acid battery of relatively light weight which delivers significantly improved cold-cranking amperage as needed in certain applications.

Still another object of this invention is to provide a lead-acid storage battery eliminating a substantial portion of the lead which does not contribute to power production.

These and other important objects of the invention will become apparent from the specification herein.

SUMMARY OF THE INVENTION

The battery of this invention offers maximum design flexibility because the terminals may easily be positioned in different portions of the battery case. Construction of the battery is made simpler and more economical by replacing the many welds and connections with poured lead conductors which simultaneously weld (or form) the intercell connectors and weld (or perhaps in some circumstances even form) intercell connectors. "Weld" as intended here means formation of metal to metal contacts by melting at an interface. Use of lead is reduced, and the conductive path shortened resulting in health and environmental benefits as well as increased battery performance.

The battery of this invention is of the type having a dielectric case with a first wall, an opposed second wall, surrounding wall structure extending between the edges of the first and second walls and partitions dividing its internal cavity into first, last and at least one middle cell, each cell containing a cell group of positive and negative plates and electrolyte. The unique battery and battery manufacturing method of this invention overcome various problems and shortcomings of the prior art, including those noted above.

The first wall (which may be the top, bottom or side wall, when the battery is oriented in position for operation) the surrounding wall structure and partitions of the dielectric case of the battery of this invention are preformed as a unit to assure that all such portions of the case, including surfaces and junctures, are hermetically sealed, thereby assuring that each cell will be completely fluid-tight and isolated from the other cells. Such first wall, surrounding wall structure and partitions are preferably integrally formed by plastic molding but may be made of two or more sections welded together. The opposed second wall is preferably sealed onto the remainder of the case as a last step in battery manufacture.

In preferred embodiments, the first wall of the inventive battery forms an inner surface in each cell which has projecting ridges with distal edges to form positive and negative wells (cavities) on each cell inner surface. Alternatively, the wells may be formed in the first wall inner surface without ridges. In certain embodiments, the ridges may also may serve as plate supports in each of the cells and also serve to form one or more sediment chambers in each cell. Such positive and negative wells extend to the adjacent partitions and each such well is aligned with—i.e., beside, but on the other side of the partition from—the well of opposite polarity of the adjacent cell.

The positive and negative wells in each cell contain lead, and the positive and negative plates are secured to the lead of the positive and negative wells, respectively. In preferred forms, the lead of each plate includes a standard grid of lead and a lug along the lower edge of the plate, the lugs of the plates being secured to the lead in the appropriate well. The lead is preferably placed into each well by feeding it there while molten just before the plate groups are inserted into cell chambers with the plate lugs being placed into the wells. Upon hardening to join with the lugs, the lead in each well forms an electrical bridge for the plates of one polarity in a cell.

The cells are connected by intercell connectors which each extend across a partition and is held by the case in position such that it electrically connects the lead in one well of a middle cell to the lead of the well of opposite polarity of the adjacent cell.

In certain preferred embodiments of this invention, each partition has an aperture therethrough at least partially within the ridge edge, and such aperture holds therein one of the intercell connectors. The intercell connectors are preferably sealed in fluid-tight relation with their respective partitions. It is most highly preferred that the partitions be plastic mold-formed around their respective intercell connectors.

In such embodiments, the intercell connectors may be located at a juncture of the partition wall with another part of the case—e.g., in position such that the edge of the intercell connector is positioned against or even slightly overlapped with (into) the first wall. Another such juncture against which a partition-mounted intercell connector could bear is the juncture of the partition with one of the cell-defining projecting ridges. Locating the intercell connectors bearing against such junctures can provide extra rigidity and allow partition walls to be somewhat thinner than might otherwise be possible, while still providing a reliable fluid-tight engagement of intercell connector and partition.

The molten lead fed into each of the aforementioned positive and negative wells not only electrically interconnects the plates of one polarity which have lugs in such well, but upon hardening is simultaneously joined with the intercell connector exposed to such well.

Certain preferred embodiments of this invention include projections extending into the wells to engage the lead in the wells and secure such lead in position. Such projections are in each well in position to interfere with any upward movement of the lead, if for any reason such lead might become loosened to any extent. Such projections secure the lead in the wells and thereby facilitate secure engagement of the lead with surfaces of the intercell connectors and reduce or eliminate stress at such connection points. Such projections, which are preferably integral with the case, may extend laterally from the upwardly projecting well-defining ridges, such as from along or near the distal edges of such ridges, or may project laterally from the partitions or surrounding wall structure.

In the most preferred form, however, the projections are anchor knobs projecting upwardly from the first wall inner surface in the wells. Such knobs are enveloped by lead in the wells. Such knobs have enlarged heads and narrow necks, and when the lead has hardened about the necks it is secured to the inner surface of the well. The anchor knobs are preferably integrally formed with the first wall inner surface.

In certain highly preferred embodiments, the first wall has a conductive member therethrough at each of the first and last cells. Each such conductive member is electrically engaged with the lead in the well of the first or last cell which is not electrically joined to an intercell connector. Such conductive members terminate in battery terminals, which may be female or male in configuration. Such terminals may project from the first wall, second wall or surrounding wall surfaces.

In preferred embodiments, the molten lead fed into such well forms not only an electrical bridge for plates, as mentioned above, but upon hardening is electrically joined to the conductive member exposed to such well.

When bottom terminals have been used, the battery is preferably connected for use by placement on a mounting surface which includes connector members placed for mating engagement with the bottom terminals.

Alternatives to bottom terminals are side terminals and top terminals. When top terminals are used, each of them will be the electrical termination of a lead structure which is attached to lead lug portions along the upper edges of the plates of one polarity in the first or last cell, such as in a manner well known in the art. Likewise, side terminal arrangements can be in a manner as known in the prior art.

While intercell connectors formed with the partitions are highly preferred, certain alternative arrangements for intercell connectors are possible. The intercell connector across such partition is at least partially within the lower edge of the partition, i.e., at least to some extent in the first wall of the case. In such embodiments, the case, including the first wall, is preferably mold-formed around the intercell connectors, most preferably completely enveloped by the first wall except to the extent that portions of the intercell connector, which straddles the partition, are exposed to the wells on either side of the partition. In some cases, rather than being mold-formed in the first wall, an intercell connector may be swedged into sealing engagement with the first wall, with portions of the intercell connector swedged in the wells of two adjacent cells.

The method for manufacturing storage batteries of the inventive type just described includes: molding plastic to integrally form the first wall and surrounding wall structure and partitions of the case, the first wall forming an inner first wall surface in each cell having projecting ridges with distal edges to define positive and negative wells extending to the adjacent partitions in alignment with the negative and positive wells, respectively, of the adjacent cells; placing an intercell connector across each partition to be held by the case in position to extend from one well of a middle cell to an adjacent well in the adjacent cell; pouring (preferably simultaneously) molten lead into each well, the lead in each well of each middle cell engaging one of the intercell connectors; inserting (preferably simultaneously) cell groups of positive and negative plates into the respective cells, the positive and negative plates having lower portions immersed in the molten lead in the positive and negative wells, respectively, before hardening; and closing the container by sealing a second wall to the surrounding wall structure.

In accordance with certain preferred methods of this invention, the placement of the intercell connector is in the partition at least partially within the ridge edge such that after manufacture the intercell connector is exposed on either side of the partition. By such placement, the intercell connector is, in effect, in an aperture which is formed in the partition around the intercell connector.

In accordance with highly preferred methods of this invention, placement of the intercell connectors precedes the molding such that the case is mold-formed around the intercell connectors.

It is preferred that the method include the additional step of fixing a conductive member in the first wall, second wall or surrounding wall structure in position to extend through the first wall at each of the first and last cells. Such conductive members terminate in battery terminals. It is highly preferred in such situations that the fixing of the conductive members precede the molding such that the first wall is mold-formed around the conductive members.

The method preferably includes, as suggested above, forming a first wall exterior (or other wall exterior such as a portion of the surrounding wall structure) having mating characteristics facilitating only correct-polarity battery connection.

Placement of the intercell connectors may be in positions other than the most preferred location which is in and extending through the partitions. One preferred alternative involves intercell connector placement in a position which is at least partially below the lower edge. In such cases, intercell connector placement still preferably precedes the molding, such that the first wall is mold-formed around the intercell connectors.

Lead-acid storage batteries made in accordance with this invention are easier and more economical to manufacture and are lighter and more efficient than lead-acid storage batteries of the prior art.

With regard to ease of manufacture, lead-acid storage batteries made in accordance with this invention are advantageous because it is not necessary to make the many separate welds and connections between plates, cells and external terminals as required in prior art batteries. The many connections between plates, cells and external terminals are formed merely by inserting the plates into the molten lead in the wells which can take place in a short time such as less than 10 seconds.

Also, this invention reduces the amount of lead (mainly "top lead") used in lead-acid batteries, making lead-acid batteries lighter and increasing their energy density. In certain embodiments, up to 50% or more of the lead of conventional lead-acid batteries which does not contribute to power production is eliminated. Energy efficiency and cold-cranking amperage are improved by shortening the electrical path in the lead-acid storage batteries of this invention, and energy distribution from the battery cells to the external terminals is more efficient because of the shorter electrical path and the resultant reduced internal resistance.

In certain lead-acid batteries in accordance with this invention, the electrical path may be reduced in length by as much as about ten inches when compared to conventional lead-acid batteries. Depending on the discharge rate requirements, a shortened electrical path can substantially reduce the electrical resistance of the battery assembly.

The method of this invention, particularly when it involves automated handling of plate groups as it preferably does, serves to reduce the number of production steps and motions and the amount of product handling during battery manufacture. This provides additional cost savings and reduces human exposure to lead.

The inventive battery may be manufactured so as to position the terminals in different locations including the top, bottom and side walls of the battery.

BRIEF DESCRIPTION OF THE DRAWINGS

FIG. 2 is a double cutaway front elevation with cutaway portions in section.

DETAILED DESCRIPTION OF THE PREFERRED EMBODIMENTS

Figure 1:
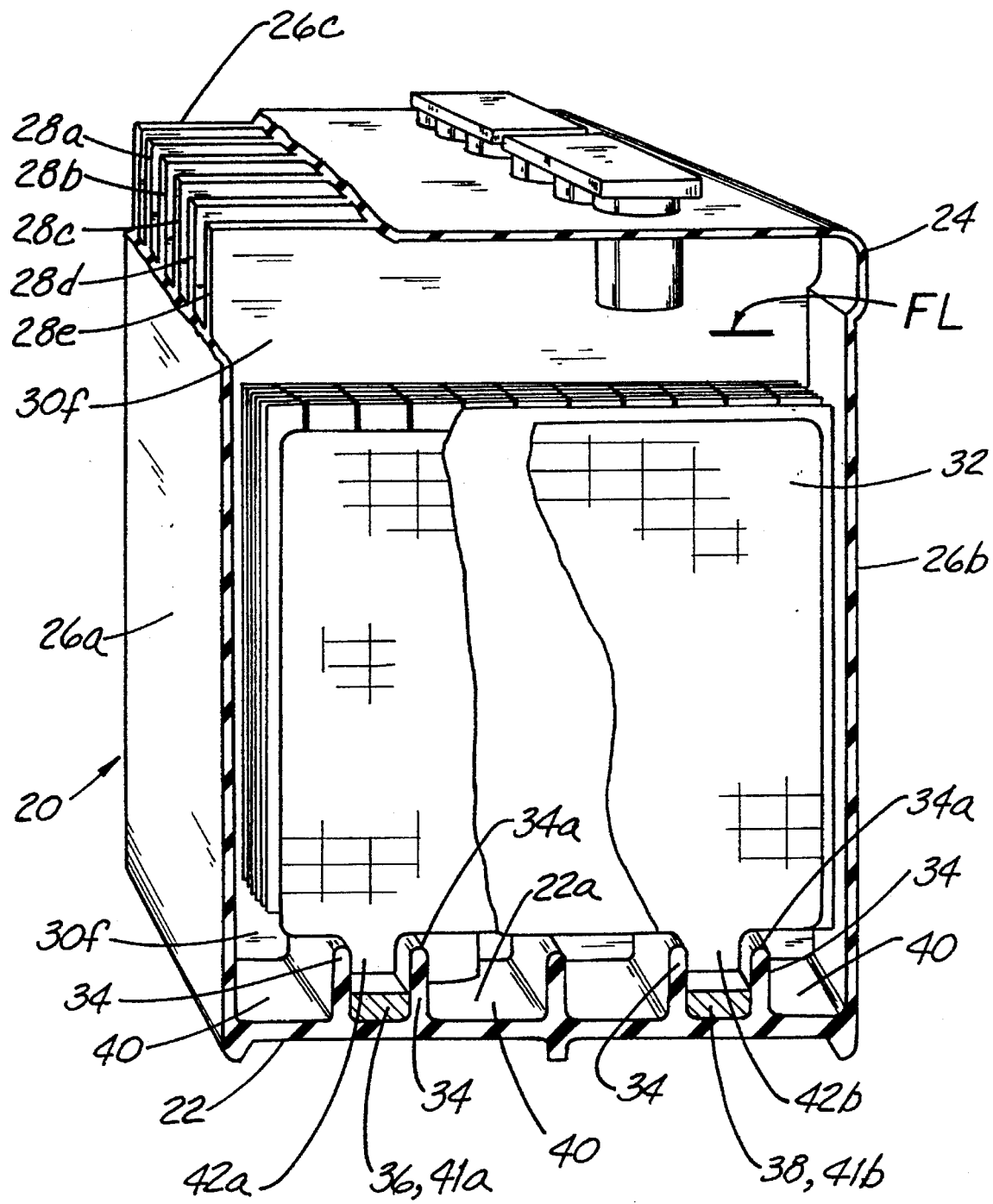
FIG. 1 is perspective view of a lead-acid battery in accordance with this invention, partially cut away to show an end cell and portions of five partitions dividing the battery into six cells.
Figure 4:
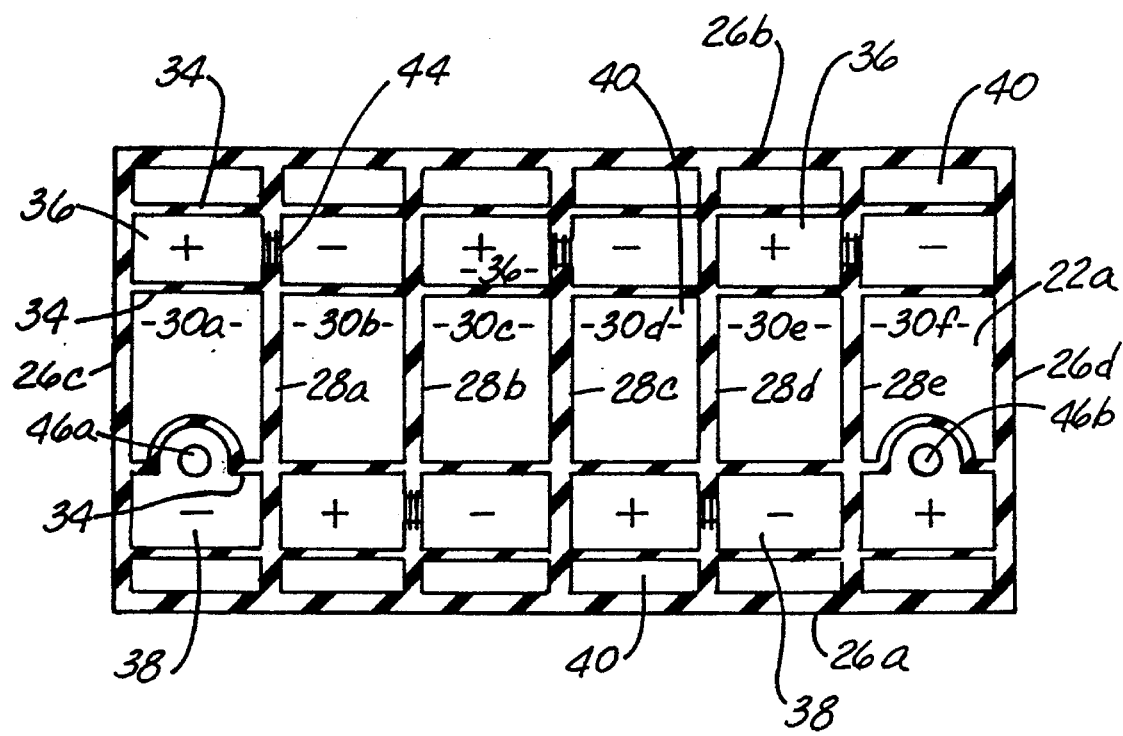
FIG. 4 is a schematic sectional illustrating the locations of intercell connectors.

FIGS. 1–4, 11 and 12 illustrate a battery 20 in accordance with this invention. Battery 20 has a dielectric plastic case 21 with a first wall 22, an opposed second top wall 24, surrounding wall structure 26a–d (in these embodiments rectilinear walls) and partitions 28a–e (sometimes identified merely by numeral 28) which divide the internal cavity of battery 20 into a first cell 30a, four middle cells 30b–e and a last cell 30f. Each cell contains a cell group 32 of positive and negative plates, of known configuration and structure, and electrolyte.

First wall 22 forms an inner first wall surface 22a in each cell which has projecting ridges 34 with distal edges 34a. Ridges 34 define positive wells 36 and negative wells 38 which extend to the adjacent partitions in alignment with negative wells 38 and positive wells 36, respectively, of the adjacent cells. Cell groups 32 rest on ridge distal edges 34a.

Ridges 34, in addition to forming wells 36 and 38, may form sediment chambers 40 (see FIG. 1).

All of the plastic battery case except second wall 24 is preformed together. More specifically, first wall 22, surrounding wall structure 26a–d and partitions 28a–e are preformed by plastic molding to have hermetically sealed surfaces and junctures. Second wall 24 is later sealed to side walls 26a–d by known sealing methods to permanently close the battery case. As hereafter noted, intercell connectors and terminals are plastic bonded in the preformed major portion of the battery case, giving a hermetically sealed preformed major case portion.

Lead pourings 41a and 41b (sometimes identified merely by numeral 41) in each of the positive and negative wells 36 and 38 are molded-in-place in each well respectively. Upon hardening lead pourings 41a and 41b join with lower lugs 42a and 42b of the cell plates of matching polarity (see FIGS. 1, 2 and 11), thereby forming electrical connection of the plates of like polarity of each cell group of plates. Upon hardening each lead pouring 41 abutting an intercell connector simultaneously joins with the intercell connector exposed to the well, as hereafter described. Alternatively, lead pourings 41a and 41b can themselves form the intercell connections.

Figure 3:
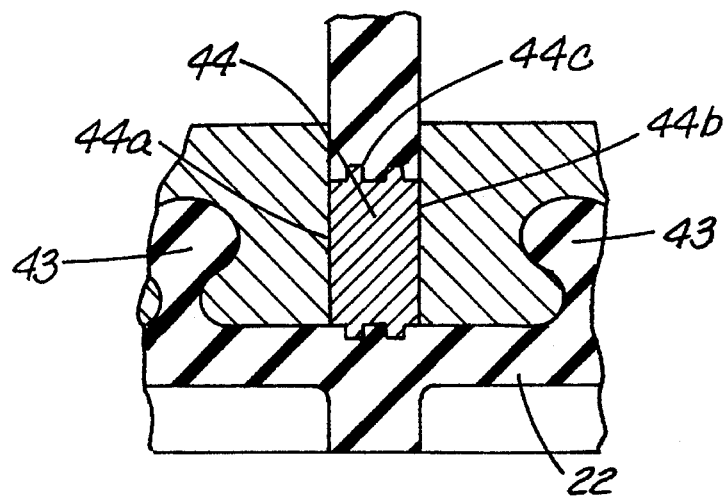
FIG. 3 is an enlarged sectional view which is a fragmentary portion of FIG. 2 selected to illustrate the intercell connector.

As shown in FIGS. 2 and 3, anchor knobs 43 project upwardly from first wall 22 and are enveloped by lead pouring 41. Anchor knobs 43 engage the lead to interfere with any movement of lead. Anchor knobs 43 are integral with inner first wall surface 22. They are formed in the original molding step, although their enlarged heads may be produced by physical depression some time after completion of molding.

Intercell connectors 44 are held by the case in position such that each electrically connects the lead in one well of a middle cell to the lead of the well of opposite polarity of the adjacent cell. Each intercell connector 44 is held in (and completely fills) an aperture 29 in partition 28. The aperture is such that partition 28 holds intercell connector 44 in fluid-tight engagement with it; in fact, such aperture is mold formed in partition 28 around intercell connector 44, thereby assuring that intercell connectors 44 are hermetically sealed in partitions 28.

FIG. 3 illustrates some of the detail of intercell connector 44 which is used in battery 20 of FIGS. 1–4. Intercell connector 44 is a solid piece of metal. It is preferably lead, but may be copper or another conductive material preferably plated or otherwise coated with lead or a lead alloy. Intercell connector 44 has opposed flat surfaces 44a and 44b and a pair of flanges 44c extending therearound to help secure it to partition 28 and hold sealing material (not shown).

Figure 11:
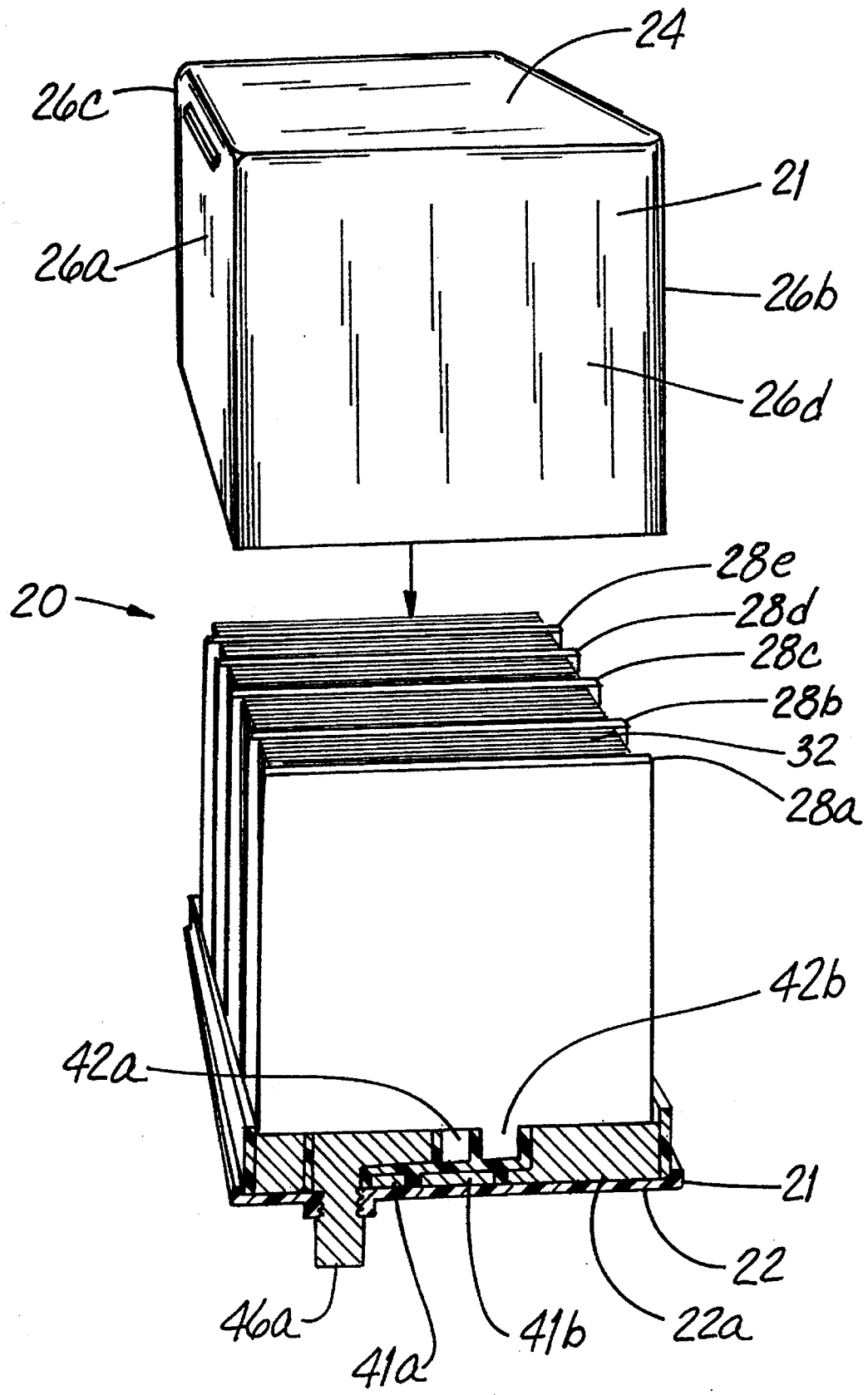
FIG. 11 is an exploded and partially cut away view of an alternative embodiment of the inventive lead-acid battery showing the top post terminal orientation.
Figure 12:
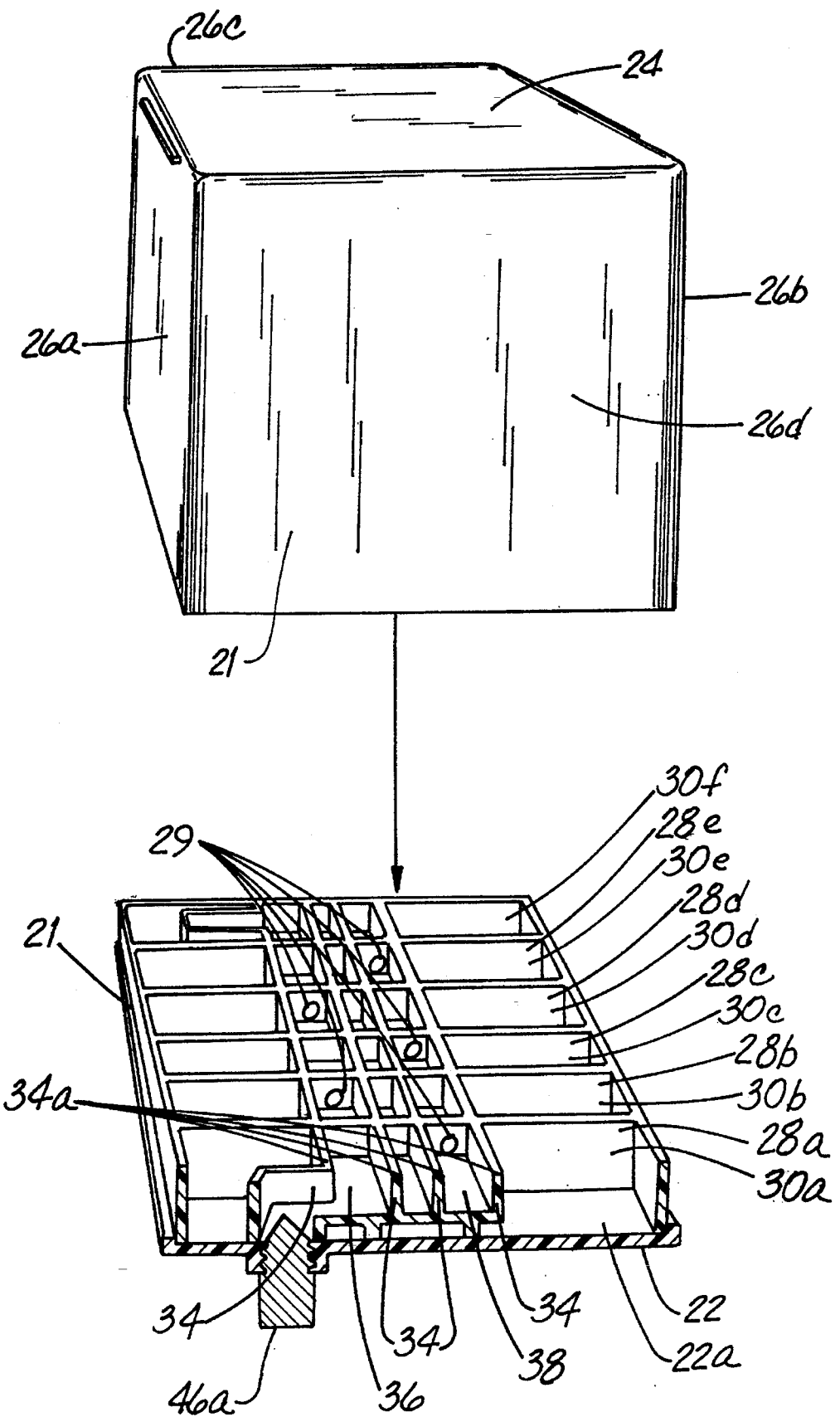
FIG. 12 is an exploded and partially cut away view of the first wall and dielectric case of an alternative embodiment of the inventive battery showing the top post terminal orientation. Certain components have been omitted for clarity.

First wall 22 has conductive members 46a and 46b extending through it at first and last cells 30a and 30f, respectively. Conductive members 46a and 46b terminate in battery terminals. Conductive members 46a and 46b are formed in the case during the initial preforming step of plastic molding. FIGS. 1 and 2 show battery 20 oriented in position for operation and terminals 46a and 46b positioned in the bottom wall of battery 20. FIGS. 11 and 12 show the battery inverted for pouring of the molten lead and include terminals 46a and 46b (not shown) positioned in the top wall of the battery when the battery is oriented in position for operation. It is also possible to position the terminals in the side walls 26a–d of battery 20.

Figure 6:
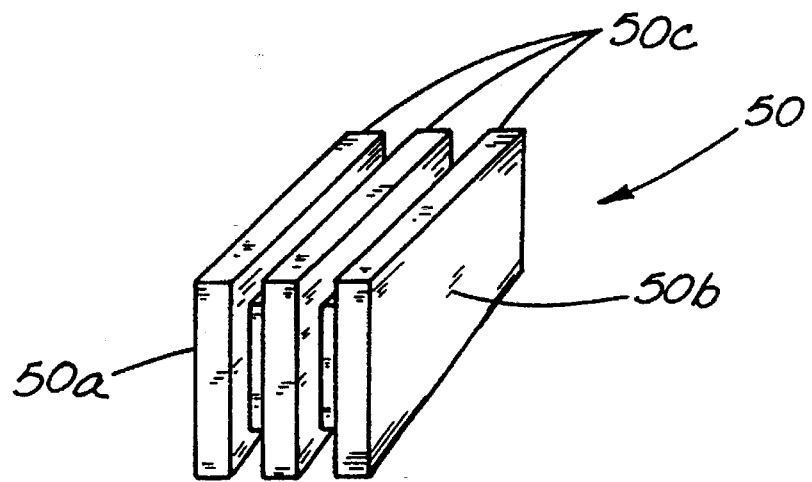
FIG. 6 is an enlarged perspective view of the intercell connector of FIG. 5.
Figure 5:
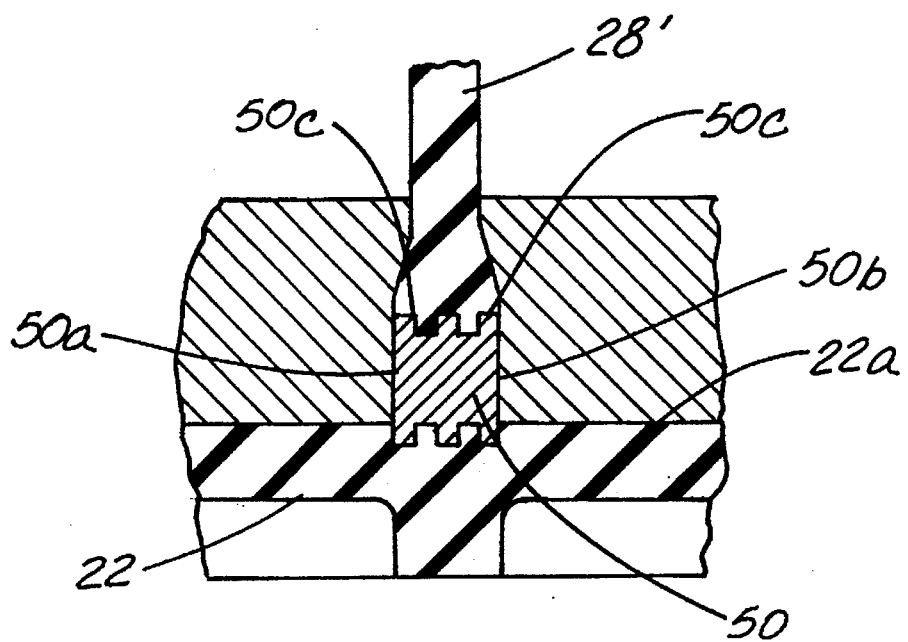
FIG. 5 is a fragmentary sectional view as in FIG. 3 but illustrating another form of intercell connector.

FIGS. 5 and 6 show an alternative form of this invention. An intercell connector 50 of somewhat greater width is held in a partition 28' which is somewhat widened at its base to accommodate intercell connector 50. Intercell connector 50 has opposed flat surfaces 50a and 50b which are larger than flat surfaces 44a and 44b of intercell connector 44. Intercell connector 50 also has three flanges 50c extending around it to facilitate its securement to partition 28' during plastic molding.

Figure 7:
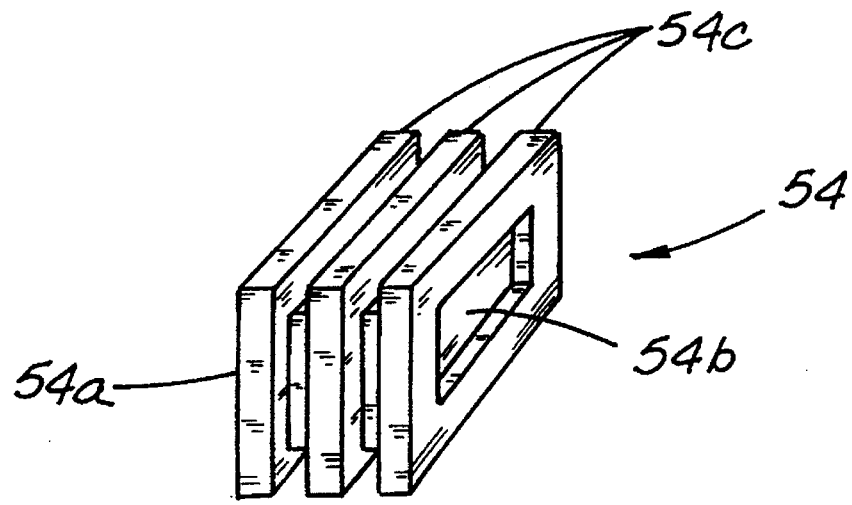
FIG. 7 is an enlarged perspective view of a variation of the intercell connector of FIGS. 5 and 6.

FIG. 7 illustrates another intercell connector 54 which has indented opposed surfaces 54a and 54b. This serves to provide additional conductive interface between the lead and the intercell connector, and to facilitate firm engagement. Intercell connector 54 also has flanges 54c for securement in partition 28'.

Figure 10:
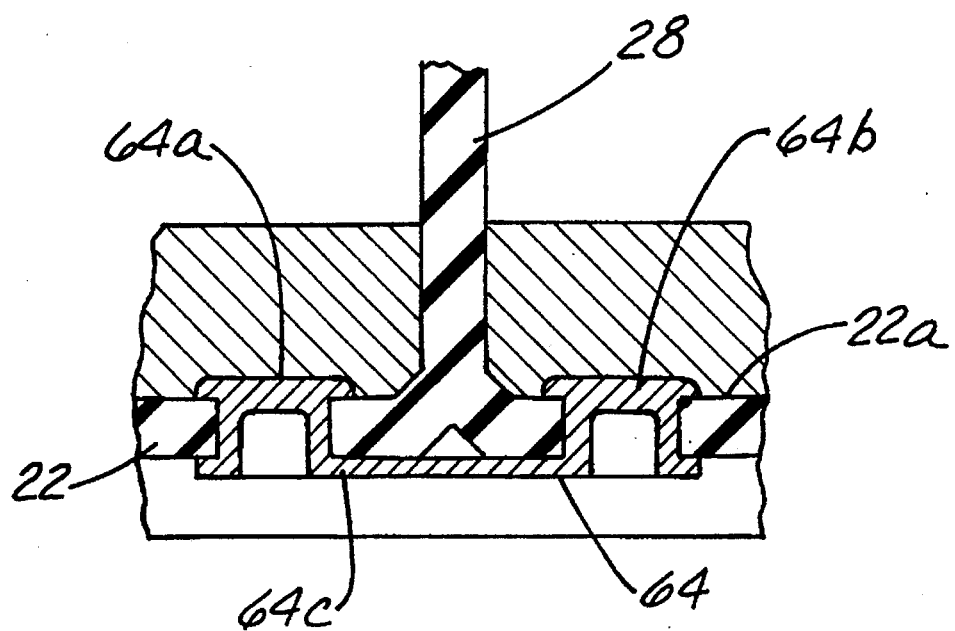
FIG. 10 is a perspective view of yet another form of intercell connector.
Figure 9:
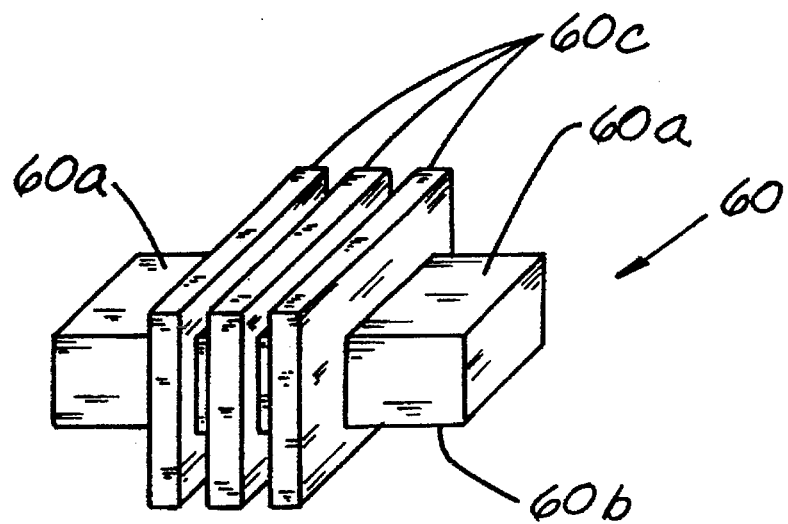
FIG. 9 is an enlarged perspective view of the intercell connector of FIG. 8.
Figure 8:
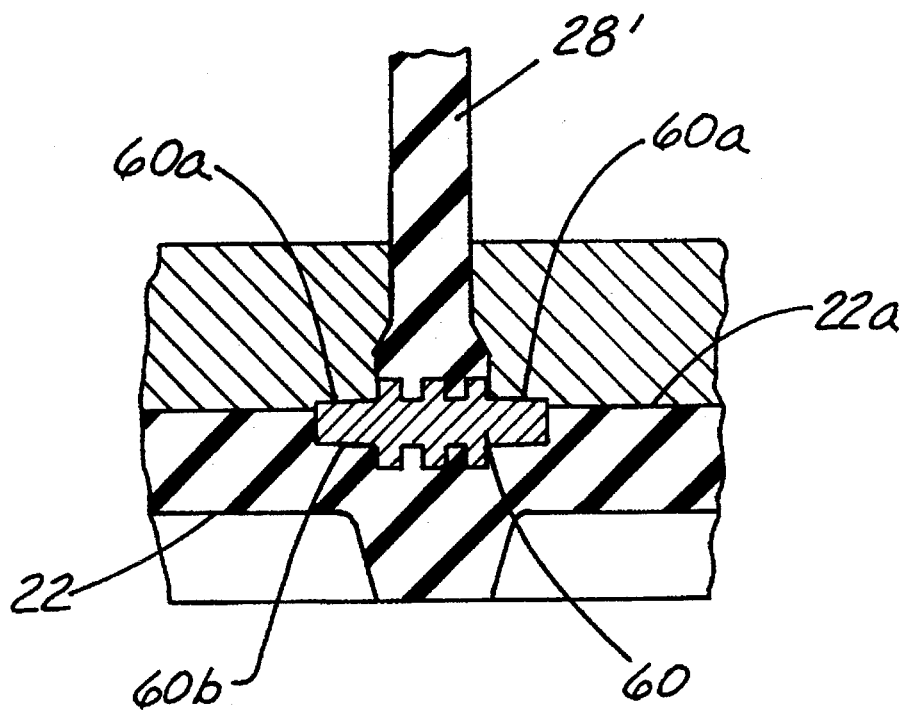
FIG. 8 is a fragmentary sectional view as in FIGS. 3 and 5 but illustrating still another form of intercell connector.

FIGS. 8–10 show other alternative forms of this invention in which at least a substantial portion of the intercell connector is recessed within the lower edge of the partition, i.e., the line along which partition 28' joins first wall 22.

One such form, illustrated in FIGS. 8 and 9, is a wide intercell connector 60 which spans across partition 28' recessed within its lower edge. Intercell connector 60 has an upper surface portions 60a which are substantially coplanar with floor 22a of each of the adjacent cells, and a lower surface 60b which is entirely surrounded by the plastic of bottom wall 22. Intercell connector 60 also has three flanges 60c around it to facilitate securement to the case.

Another such form is intercell connector 64 shown in FIG. 10. Intercell connector 64, which spans partition 28, is attached to first wall 22 after the preforming step described above. Intercell connector 64 has cap portions 64a and 64b which are swedged into fluid tight engagement with first wall 22. Intercell connector 64 also has a lower surface 64c which is configured to facilitate swedging, and which after attachment is exposed on the underside of the battery.

The inventive method of manufacture of various embodiments of the battery of this invention has been described above. In addition, a key inventive feature, variation in the position of the terminals, has been described above. In addition, dielectric case 21 may be cylindrical or some other configuration rather than the rectilinear shape shown in FIGS. 1–4, and 11–12. Many variations are possible in the ordering of steps and in related structures.

While the principles of this invention have been described in connection with specific embodiments, it should be understood clearly that these descriptions are made only by way of example and are not intended to limit the scope of the invention.

We claim:

1. A method for manufacturing a storage battery of the type having a dielectric case with a first wall, an opposed second wall, surrounding wall structure extending between the edges of the first and second walls and thereby forming an internal cavity and partitions dividing the internal cavity into first, last and at least one middle cells, each containing a cell group of positive and negative plates and electrolyte, comprising:

forming the first wall, surrounding wall structure and partitions, the first wall having an inner surface in each cell with positive and negative wells thereon extending to the adjacent partitions in alignment with the negative and positive wells, respectively, of the adjacent cells;

placing a solid intercell connector across each partition to be held by the case in position to extend from one well of a middle cell to an adjacent well in the adjacent cell;

pouring molten lead into each well;

inserting a cell group of positive and negative plates into each cell, the positive and negative plates having lower portions immersed in the molten lead in the positive and negative wells, respectively;

permitting the molten lead to cool and harden, such lead thereby joining to the intercell connectors; and closing the container by sealing a second wall to the surrounding wall structure surfaces;

whereby the cells are completely sealed from one another and the intercell connectors each electrically connect the lead in one well of a middle cell to the lead of the well of opposite polarity of the adjacent cell.

2. The method of claim 1 wherein intercell connector placement is within the wells such that after manufacture the intercell connector is exposed on either side of the partition.

3. The method of claim 1 wherein the placing step includes fixing a pair of conductive members in the first wall and extending therethrough into the first and last cells, the conductive members terminating in battery terminals.

4. The method of claim 1 wherein the forming step is preceded by the step of fixing a pair of conductive members and the forming step includes mold-forming the first wall around the conductive members.

5. The method of claim 1 wherein one of the said partitions has an edge joining the inner surface of the first wall and at least one of said intercell connectors is placed to be partially recessed into the first wall.

6. The method of claim 5 wherein the forming step is preceded by the step of fixing at least two of said intercell connectors and the forming step includes mold-forming the first wall around the intercell connectors.

7. In a battery having a dielectric case with a first wall, an opposed second wall, surrounding wall structure extending between the edges of the first and second walls and thereby forming an internal cavity, and partitions formed of molded plastic and dividing the internal cavity into first, last and at least one middle cells, each cell containing a cell group of positive and negative plates and electrolyte, the improvement comprising:

the first wall having an inner surface in each cell with positive and negative wells thereon extending to the adjacent partitions in alignment with the negative and positive wells, respectively, of the adjacent cells;

a solid metal intercell connector across each partition and positionally secured with respect to such partition by the molded plastic; and poured lead in each well, the positive and negative plates secured to the lead of the positive and negative wells, respectively, the poured lead being joined to each intercell connector when such poured lead hardens by cooling, the poured lead electrically connecting one well of a middle cell to the well of opposite polarity of an adjacent cell;

whereby the cells are completely sealed from one another.

8. The battery of claim 7 wherein the solid metal intercell connector across each partition is in fluid-tight engagement with such partition.

9. The battery of claim 7 wherein:

the battery has at least one metal terminal;

the surrounding wall structure and the partitions are integrally mold-formed plastic; and one of the walls is mold-formed with the terminal.

10. The battery of claim 7 wherein the first wall has a conductive member therethrough at each of the first and last cells, each of the conductive members terminating in a battery terminal and wherein the poured lead is joined to the conductive member when such poured lead hardens by cooling.

11. The battery of claim 10 wherein at least one of the terminals is a female member for mating with a male connector.

12. The battery of claim 10 wherein at least one of the terminals is a male member for mating with a female connector.

13. The battery of claim 7 wherein one of said each partitions has an edge joining the inner surface of the first wall and the intercell connector across the one of said each partitions is partially recessed into the first wall.

14. The battery of claim 7 including projections extending into the wells and engaging the poured lead therein to interfere with any movement of such poured lead, thereby securing the poured lead in the wells and facilitating secure engagement of the poured lead with surfaces of the intercell connectors.

15. The battery of claim 14 wherein the projections are anchor knobs which are integral with the inner surface of the first wall, project therefrom in the wells, and are enveloped by lead in the wells.

16. A method for manufacturing a storage battery of the type having a dielectric case with a first wall, an opposed second wall, surrounding wall structure extending between the edges of the first and second walls and thereby forming an internal cavity, and partitions dividing the internal cavity into first, last and at least one middle cells, each containing a cell group of positive and negative plates and electrolyte, the method comprising the steps of:

placing a plurality of solid intercell connectors;

forming the first wall, surrounding wall structure and partitions, each partition being formed around a respective one of the intercell connectors, the first wall having an inner surface in each cell with positive and negative wells thereon extending to the adjacent partitions in alignment with the negative and positive wells, respectively, of the adjacent cells;

pouring molten lead into each well;

inserting a cell group of positive and negative plates into each cell, the positive and negative plates having lower portions immersed in the molten lead in the positive and negative wells, respectively;

permitting the molten lead to cool and thereby harden, such lead thereby joining to one of the intercell connectors; and closing the container by sealing a second wall to the surrounding wall structure surfaces;

whereby the cells are completely sealed from one another and the intercell connectors each electrically connect the lead in one well of a middle cell to the lead of the well of opposite polarity of the adjacent cell.

17. In a battery having a dielectric case with a first wall, an opposed second wall, surrounding wall structure extending between the edges of the first and second walls and partitions dividing its internal cavity into first, last and at least one middle cells, each cell containing a cell group of positive and negative plates and electrolyte, the improvement comprising:

the first wall having an inner surface in each cell with positive and negative wells thereon extending to the adjacent partitions in alignment with the negative and positive wells, respectively, of the adjacent cells;

poured lead in each well, the positive and negative plates secured to the lead of the positive and negative wells, respectively;

an intercell connector across each partition, each intercell connector held by the case in position adjacent to the inner surface of the first wall and electrically connecting the lead in one well of a middle cell to the lead of the well of opposite polarity of the adjacent cell; and at least one projection extending into each of the wells and engaging the poured lead therein to interfere with any movement of the poured lead, thereby securing the poured lead in the wells.

18. The battery of claim 17 wherein the projections are anchor knobs which are integral with the inner surface of the first wall, project therefrom in the wells, and are enveloped by lead in the wells.

* * * * *